(12) United States Patent
Tsoi et al.

(10) Patent No.: US 11,055,540 B2
(45) Date of Patent: Jul. 6, 2021

(54) METHOD FOR DETERMINING ANCHOR BOXES FOR TRAINING NEURAL NETWORK OBJECT DETECTION MODELS FOR AUTONOMOUS DRIVING

(71) Applicant: Baidu USA LLC, Sunnyvale, CA (US)

(72) Inventors: Ka Wai Tsoi, Sunnyvale, CA (US); Tae Eun Choe, Sunnyvale, CA (US); Yuliang Guo, Sunnyvale, CA (US); Guang Chen, Sunnyvale, CA (US); Weide Zhang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 88 days.

(21) Appl. No.: 16/457,820

(22) Filed: Jun. 28, 2019

(65) Prior Publication Data

US 2020/0410252 A1 Dec. 31, 2020

(51) Int. Cl.
*G06K 9/00* (2006.01)
*G06K 9/62* (2006.01)
(52) U.S. Cl.
CPC ....... *G06K 9/00791* (2013.01); *G06K 9/6202* (2013.01); *G06K 9/6218* (2013.01); *G06K 9/6256* (2013.01)

(58) Field of Classification Search
None
See application file for complete search history.

(56) References Cited

U.S. PATENT DOCUMENTS

2019/0258878 A1\* 8/2019 Koivisto .................. G05D 1/00
2020/0272854 A1\* 8/2020 Caesar ................. G06K 9/6292

\* cited by examiner

*Primary Examiner* — Leon Flores
(74) *Attorney, Agent, or Firm* — Womble Bond Dickinson (US) LLP (57) ABSTRACT

In one embodiment, a set of bounding box candidates are plotted onto a 2D space based on their respective dimension (e.g., widths and heights). The bounding box candidates are clustered on the 2D space based on the distribution density of the bounding box candidates. For each of the clusters of the bounding box candidates, an anchor box is determined to represent the corresponding cluster. A neural network model is trained based on the anchor boxes representing the clusters. The neural network model is utilized to detect or recognize objects based on images and/or point clouds captured by a sensor (e.g., camera, LIDAR, and/or RADAR) of an autonomous driving vehicle.

20 Claims, 10 Drawing Sheets

| Anchor Box | Probability | Cx | Cy | Delta(x) | Delta(y) |
|---|---|---|---|---|---|
| Box 1 | | | | | |
| Box 2 | | | | | |
| Box 3 | | | | | |
| ⋮ 251 | ⋮ 252 | ⋮ 253 | ⋮ 254 | ⋮ 255 | ⋮ 256 |

METHOD FOR DETERMINING ANCHOR BOXES FOR TRAINING NEURAL NETWORK OBJECT DETECTION MODELS FOR AUTONOMOUS DRIVING

TECHNICAL FIELD

Embodiments of the present disclosure relate generally to operating autonomous vehicles. More particularly, embodiments of the disclosure relate to training neural network object detection models for autonomous driving.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. In autonomous driving, it is important to detect objects surrounding an autonomous driving vehicle (ADV) in order to plan a trajectory for the ADV to navigate through the driving environment. Recently, artificial intelligence (AI) has been utilized for object detection. Objection detection models using deep neural networks often make use of the concept of anchor boxes, which are predefined with certain sizes and shapes.

A neural network estimates object bounding boxes by regressing on the change on anchor boxes instead of directly estimating the object bounding box widths and heights. As a result, a good anchor box selection is equivalent to providing a good prior on bounding box estimation and thus easier for the neural network to learn and to result in a higher object detection performance. However, there has been a lack of efficient ways to identify and select appropriate or good anchor boxes for neural network object detection.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, in order to select good anchor boxes from a set of bounding box candidates, the bounding box candidates, when selected, are utilized as a training set for training a neural network model for object detection. The bounding box candidates are plot into a two-dimensional (2D) space with width as the x-axis and height as the y-axis. One or more points representing one or more anchor boxes are initially selected based on the density of the points representing the bounding box candidates. The bounding box candidates are then clustered by assigning the bounding box candidates based on their relationship with each of the anchor boxes. The position of at least one anchor box is iteratively adjusted and the distribution of the bounding box candidates in view of the anchor boxes satisfies a predetermined condition, upon which the anchor boxes become the final anchor boxes for training a neural network. As a result, a neural network can be trained to use better anchor boxes for object detection without having to search an unnecessary larger searching space for detecting an object, which in turn improves the efficiency of object detection in real-time.

According to one embodiment, a set of bounding box candidates are plotted onto a 2D space based on their respective dimension (e.g., widths and heights). The bounding box candidates are clustered on the 2D space based on the distribution density of the bounding box candidates. For each of the clusters of the bounding box candidates, an anchor box is determined to represent the corresponding cluster. A neural network model is trained based on the anchor boxes representing the clusters. The neural network model is utilized to detect or recognize objects based on images and/or point clouds captured by a sensor (e.g., camera, LIDAR, and/or RADAR) of an autonomous driving vehicle.

In one embodiment, the x-axis of the 2D space represents the width of a bounding box while the y-axis of the 2D space represents the height of the bounding box. When clustering the bounding box candidates, for each of the bounding box candidates, a matching degree is calculated between the bounding box candidate and each of the anchor boxes. The bounding box candidate is then assigned to or associated with an anchor box that has the highest the matching degree. In one embodiment, a matching degree between a bounding box candidate and an anchor box is determined based on an overlapped area between the bounding box candidate and the anchor box. In a particular embodiment, the matching degree is calculated based on an intersection over union (IOU) ratio between the area of the bounding box candidate and the area of the anchor box.

According to one embodiment, the process of clustering the bounding box candidates is iteratively performed and during each iteration, a position of at least one anchor box is adjusted and the matching degree between each bounding box candidate and each anchor box is recalculated, until a distribution of the bounding box candidates assigned to anchor boxes satisfies a predetermined condition. The predetermined condition is satisfied if a number of bounding boxes associated with each of the anchor boxes is greater than a predetermined threshold. The predetermined condition is satisfied when the difference between a number of bounding box candidates associated with each of the anchor boxes is less than a predetermined threshold (e.g., the numbers of bounding box candidates are similar). The predetermined condition is satisfied when each of the anchor boxes falls within a dense area of the bounding box candidates. The predetermined condition is satisfied when the aspect ratios of the bounding box candidates within a cluster are similar.

Figure 1:
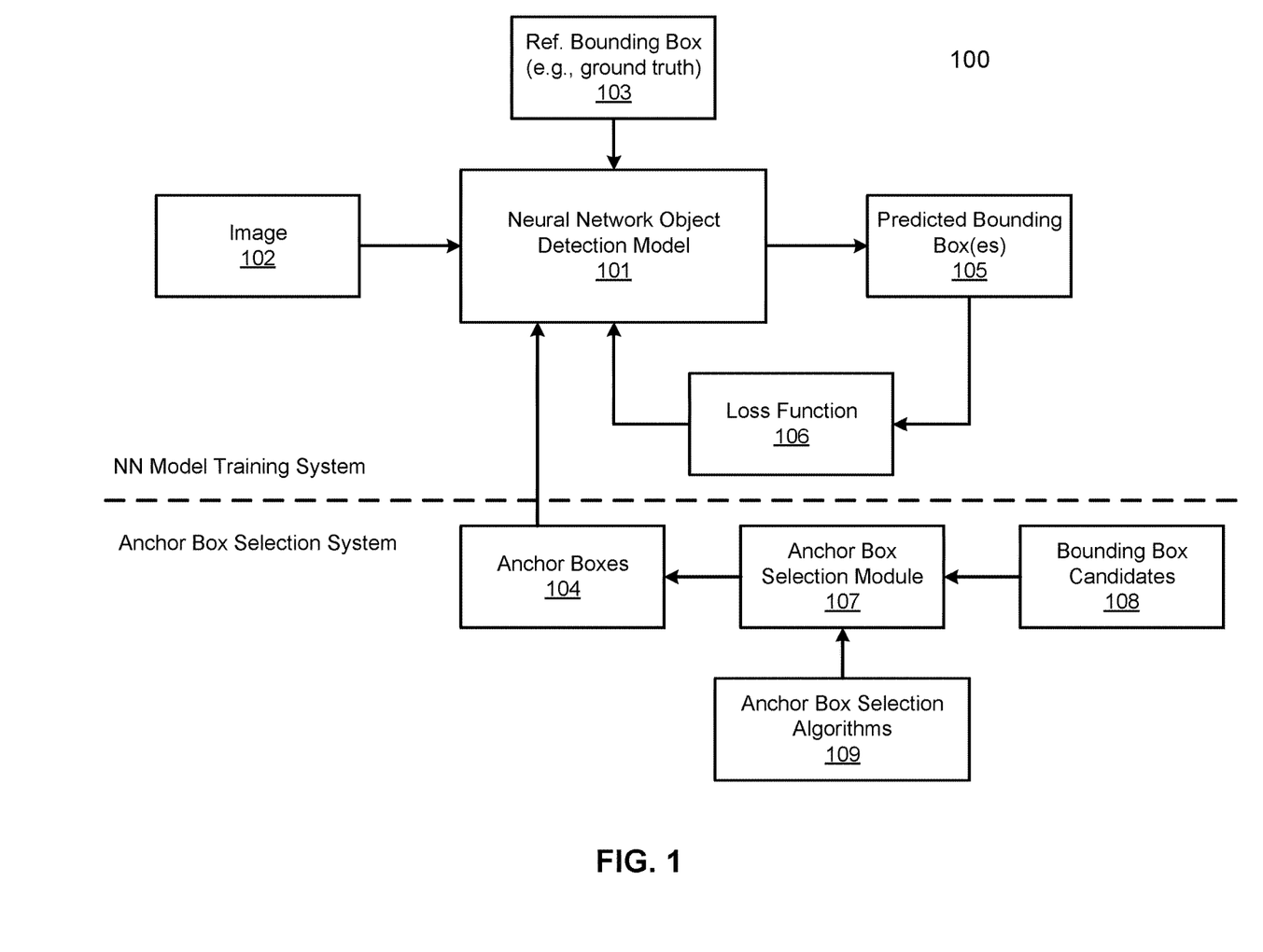
FIG. 1 is a block diagram illustrating a neural network training system according to one embodiment.

FIG. 1 is a block diagram illustrating a neural network object detection training system according to one embodiment. Referring to FIG. 1, system 100 is a neural network (NN) training system that includes object detection model 101 to be trained as a neural network model. A set of images captured by one or more sensors of autonomous driving vehicles containing one or more known objects captured therein are utilized to train object detection model 101 to detect and recognize the objects based on a known reference bounding box and a set of anchor boxes that are selected from a set of bounding box candidates.

In this example, image 102 is fed to object detection model 101, where image 102 contains a known object. In addition, a known reference bounding box 103 (also referred to as a ground truth bounding box) that has been configured to cover and match the object captured by image 102 for the purposing of detecting the object. A set of anchor boxes 104 are utilized as training points to train the NN model 101 to detect and recognize the object. The output 105 of each iteration during the training contains a predicted bounding box based on the corresponding anchor box 104 and reference bounding box 103 ($C_{x0}$, $C_{y0}$). Output 105 include information indicating a center of the predicted bounding box ($C_x$, $C_y$) and the offset ($\Delta x$, $\Delta y$) between the predicted bounding box ($C_x$, $C_y$) and reference bounding box 103, as well as a probability of the predicted bounding box detecting the object.

A loss is calculated using loss function 106, where the loss 106 represents an error between the ground truth and a corresponding anchor box. In one embodiment, loss function 106 may be represented by:

Loss=$(C_{x0}-C_x)$/\2+$(C_{r0}-C_y)$/\2

The total loss of each iteration in view of all of anchor boxes 104 can be calculated by summing the individual lass of each anchor box. The loss is then feedback to the model 101 and another iteration is performed until a predetermined condition is satisfied such as the total loss is below a predetermined threshold or a number of iteration reaches a predefined maximum number of iterations.

Figure 2A:
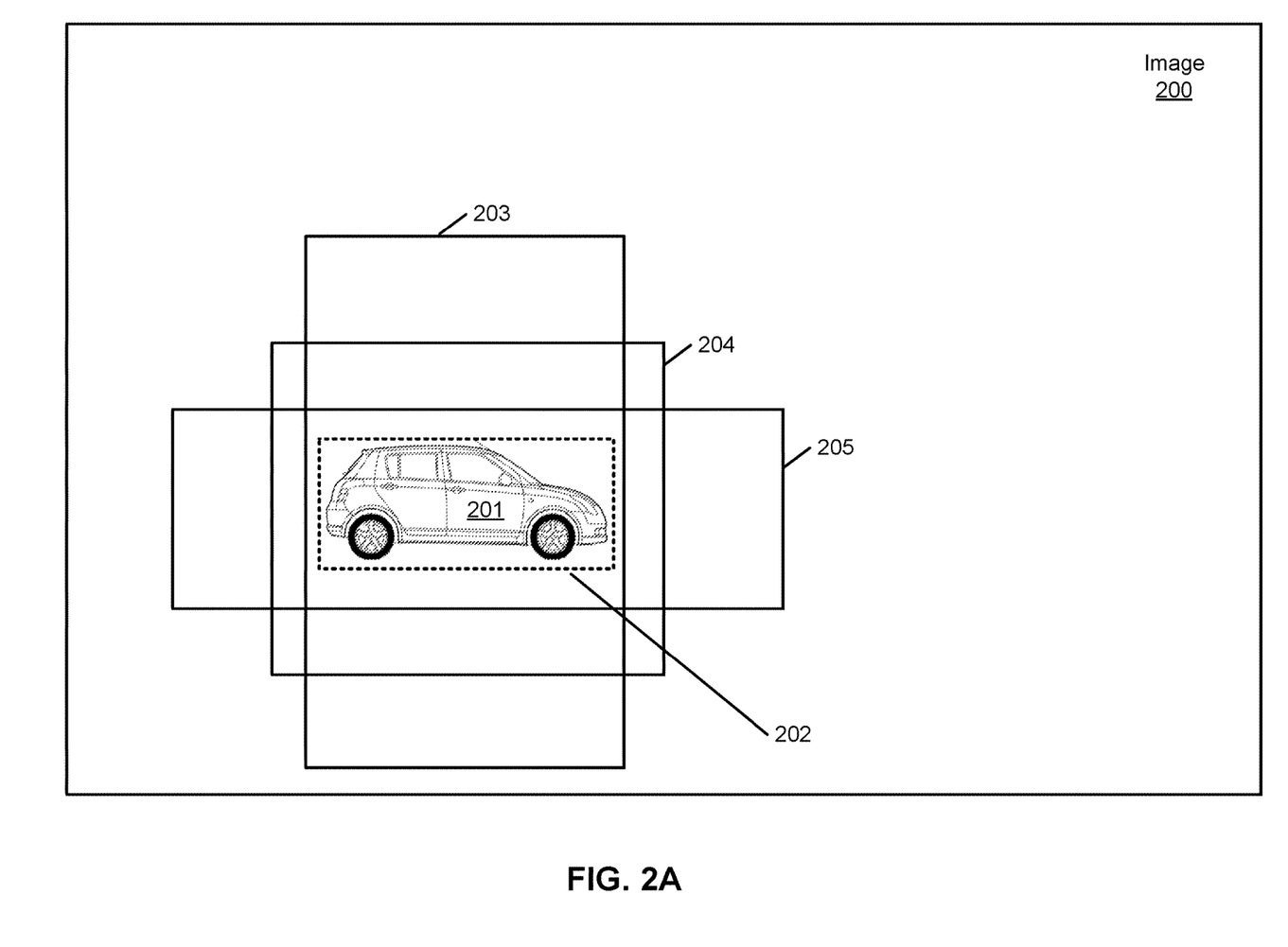
FIG. 2A shows an example of an image having different bounding boxes for training a neural network according to one embodiment.

For the purpose of illustration, referring now to FIG. 2A, image 200 is utilized to train an NN model such as NN model 101. Typically, image 200 will be partitioned into a number of cells and the model is to search each cell to detect whether there is an object detected therein. Thus, the model has to search all space within image 200, which may take a long time and computing resource to do that. According to one embodiment, if a set of anchor boxes are defined and utilized to guide model to perform the searching of the object, the search space can be greatly reduced and the speed and accuracy of the searching can be improved significantly.

In this example, referring to FIGS. 1 and 2, for the training purpose, an object 201 (e.g., a vehicle) is known and a ground truth bounding box 202 is provided to cover the object. That means if the searching is performed within the ground truth bounding box 202, object 201 can be quickly identified. In order to train the NN model, a set of bounding box candidates 203-205 are utilized to train the weights and bias of the NN model. Although there are only three bounding box candidates, more candidates may be utilized. The output 105 of the NN model includes information describing the accuracy of each of the bounding box candidates 203-205 based on the ground truth box 202 and bounding box candidates 203-205.

Figure 2B:
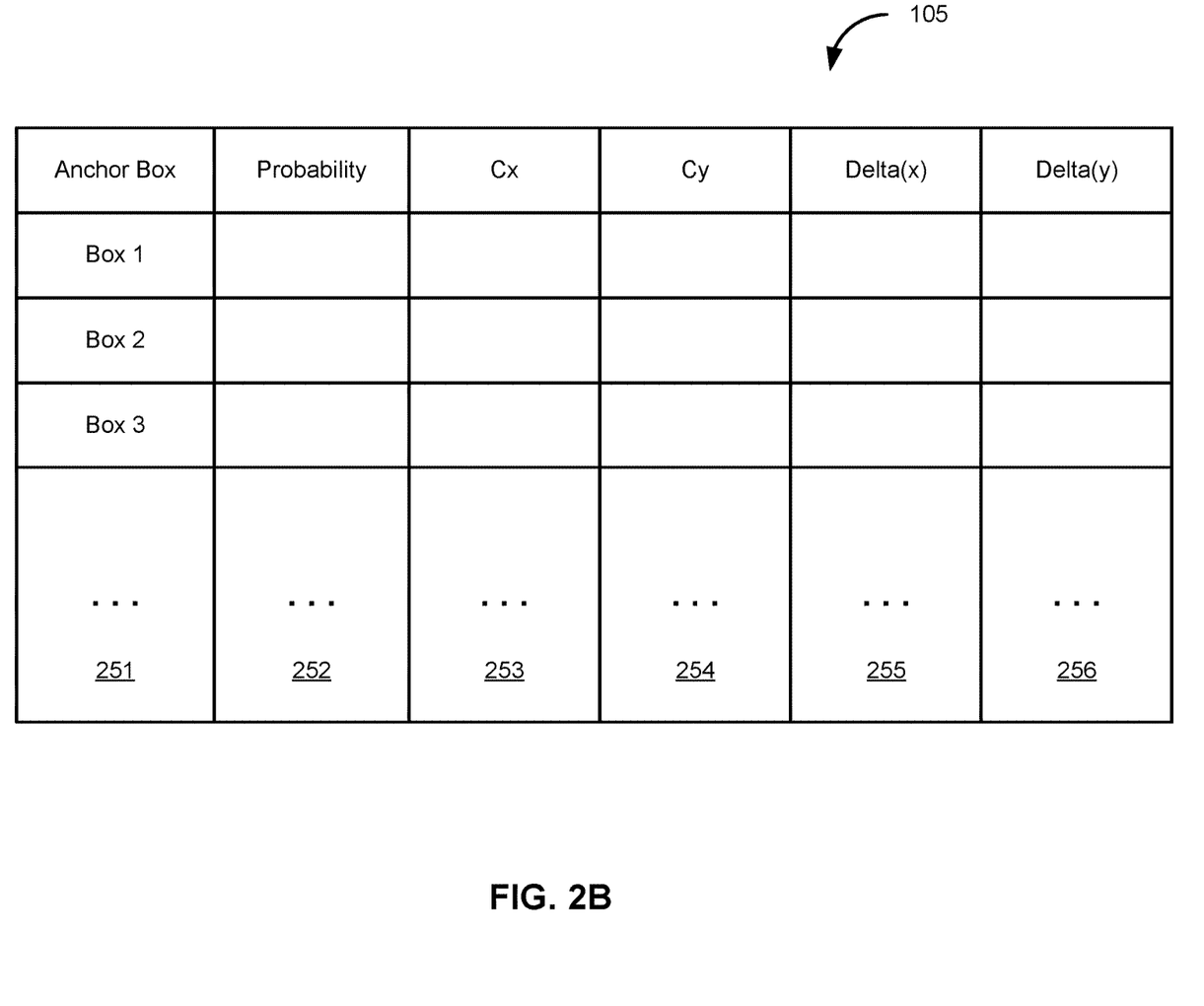
FIG. 2B shows a data structure representing an output of a training process of a neural network according to one embodiment.

In one embodiment, the output of the NN model includes the center, offset, and probability of detecting an object for each of the predicted bounding boxes that have been determined by the NN model as shown in FIG. 2B. Referring to FIG. 2B, in this example, the output of an NN model includes for each of the bounding box candidates 251, probability 252 of detecting an object, center of the predicted box 253 and 254, as well as the offsets 255 and 256. A loss is calculated using loss function 106 and based on the loss, the weights and bias of the NN model are adjusted and the training is iteratively performed until a predetermined condition occurs as described above.

Referring back to FIG. 1, as described above, the size and shape of anchor boxes 104 are important as these parameters will define how model 101 will search and detect the object in image 102 in view of the corresponding ground truth 103. In one embodiment, anchor boxes 104 are identified and selected by anchor box selection module or system 107 from a set of bounding box candidates 108 using a set of one or more selection rules 109. The anchor boxes 104 are selected to represent most of the bounding box candidates, for example, with similar size and shape, and aspect ratios, etc.

Figure 3:
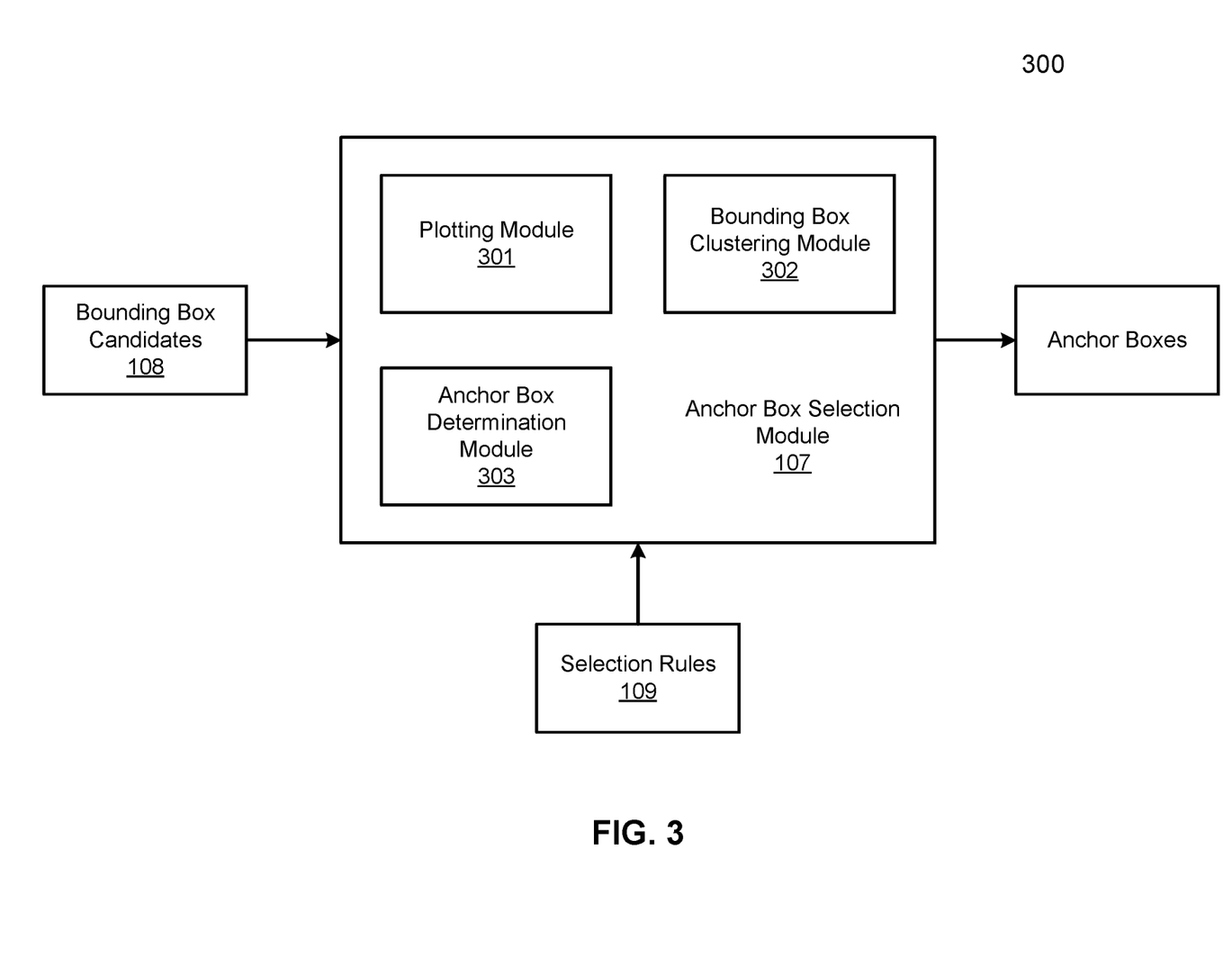
FIG. 3 is a block diagram illustrating an anchor box selection system according to one embodiment.

FIG. 3 is a block diagram illustrating an example of an anchor box selection system according to one embodiment. Referring to FIG. 3, system 300 is configured to cluster a set of bounding box candidates and identify and select an anchor box (or a cluster representative) to represent each of the clusters. In one embodiment, anchor box selection module 107 includes a plotting module 301, bounding box clustering module 302, and anchor box determination module 303. Plotting module 301 is configured to plot a set of bounding box candidates 108 onto a 2D space based on their respective dimension (e.g., widths and heights). Clustering module 302 is configured to cluster the bounding box candidates into one or more clusters on the 2D space based on the distribution density of the bounding box candidates. For each of the clusters of the bounding box candidates, anchor box determining module 303 determines an anchor box to represent the corresponding cluster. A neural network model can then be trained based on the anchor boxes representing the clusters. The neural network model is utilized to detect or recognize objects based on images and/or point clouds captured by a sensor (e.g., camera, LIDAR, and/or RADAR) of an autonomous driving vehicle.

Figure 4:
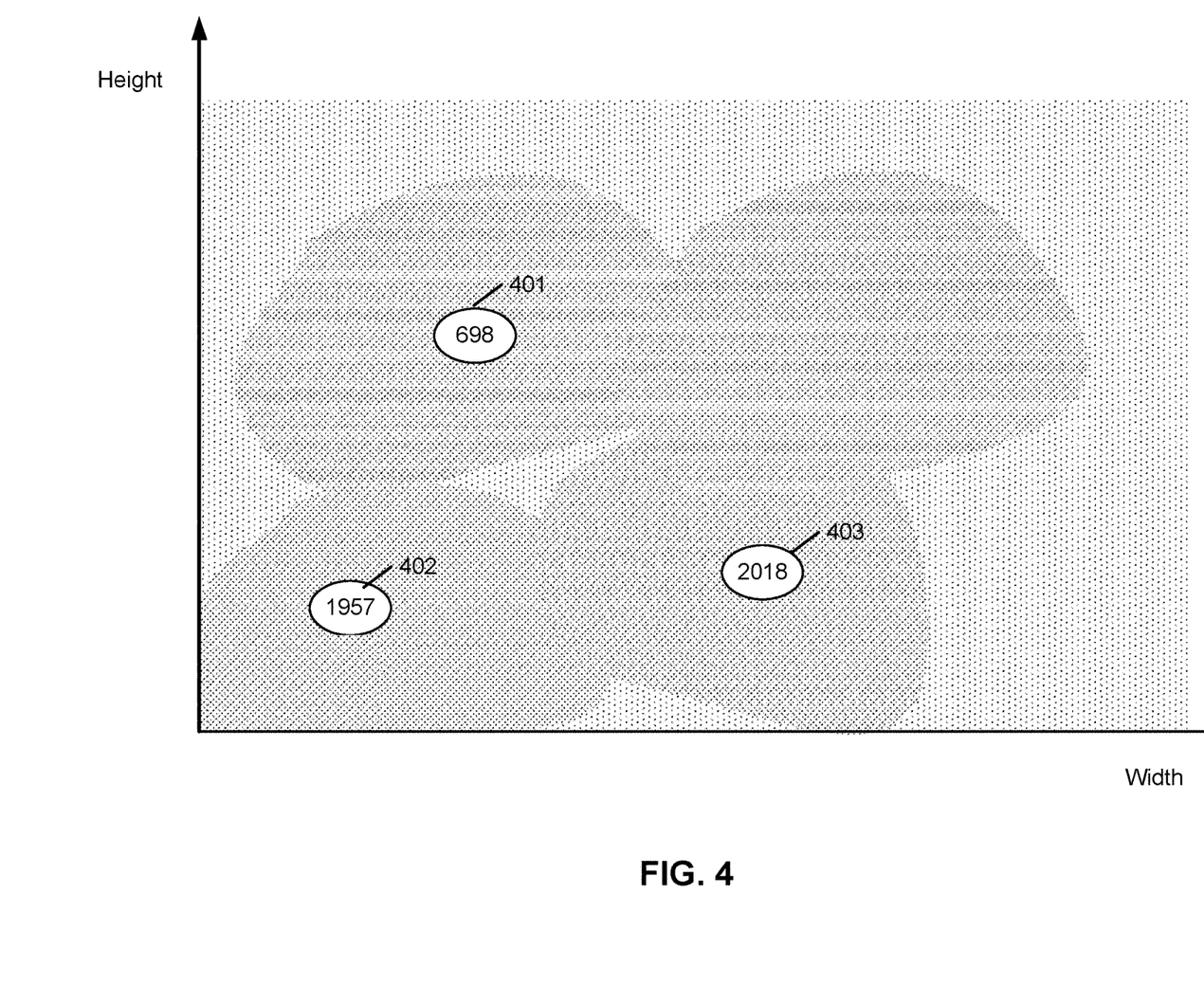
FIG. 4 shows a two-dimensional space having bounding boxes distributed thereon according to one embodiment.

In one embodiment, referring now to FIG. 4, the x-axis of the 2D space represents the width of a bounding box while the y-axis of the 2D space represents the height of the bounding box. Each dot shown in the 2D space represents a bounding box candidate with the width and height corresponding to their coordinate (x, y) on the 2D space. When clustering the bounding box candidates, for each of the bounding box candidates, a matching degree (also referred to as a similarity score) is calculated between the bounding box candidate and each of the anchor boxes. A matching degree refers to a degree of similarity between an anchor box and a bounding box candidate in size and shape. The bounding box candidate is then assigned to or associated with an anchor box that has the highest the matching degree. In one embodiment, a matching degree between a bounding box candidate and an anchor box is determined based on an overlapped area between the bounding box candidate and the anchor box. In a particular embodiment, the matching degree is calculated based on an intersection over union (IOU) ratio between the area of the bounding box candidate and the area of the anchor box.

In this example, a set of anchor boxes such as anchor boxes 401-403 are selected based on the population density of the bounding box candidates. For each of the anchor boxes 401-403, a matching degree between the anchor box and each of the bounding box candidates is calculated. Each of the bounding box candidates is assigned to one of the anchor boxes having the highest matching degree. In this example, there are 698 bounding box candidates assigned to anchor box 401, 1957 bounding box candidates assigned to anchor box 402, and 2018 bounding box candidates assigned to anchor box 403.

According to one embodiment, the process of clustering the bounding box candidates is iteratively performed and during each iteration, a position of at least one anchor box is adjusted and the matching degree between each bounding box candidate and each anchor box is recalculated, until a distribution of the bounding box candidates assigned to anchor boxes satisfies a predetermined condition. The predetermined condition is satisfied if a number of bounding boxes associated with each of the anchor boxes is greater than a predetermined threshold. The predetermined condition is satisfied when the difference between a number of bounding box candidates associated with each of the anchor boxes is less than a predetermined threshold (e.g., the numbers of bounding box candidates are similar). The predetermined condition is satisfied when each of the anchor boxes falls within a dense area of the bounding box candidates. The predetermined condition is satisfied when the aspect ratios of the bounding box candidates within a cluster are similar. At the end, a set of final anchor boxes are selected for training an NN model as described above.

Figure 5A:
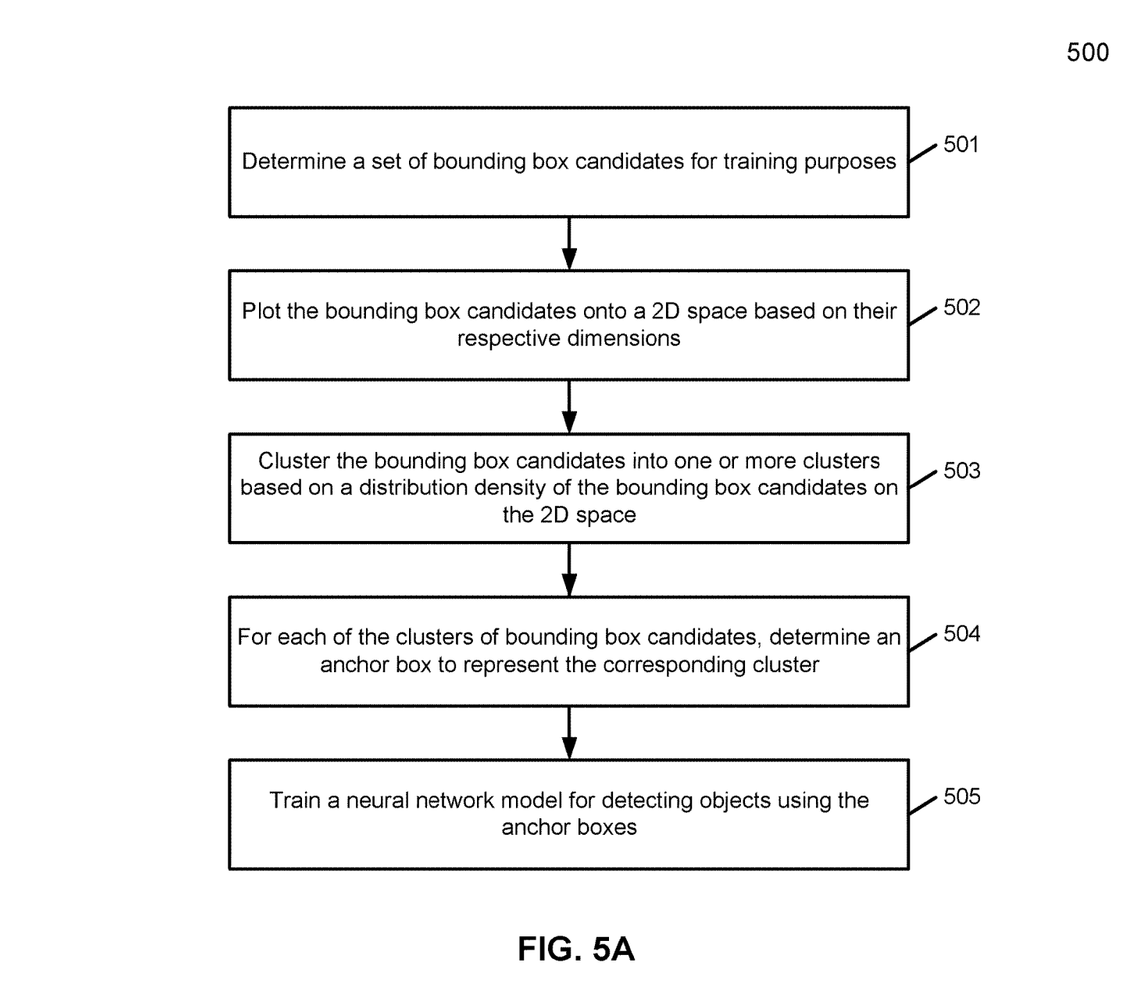
FIGS. 5A and 5B are flow diagrams illustrating examples of processes for selecting anchor boxes according to certain embodiments.

FIG. 5A is a flow diagram illustrating an example of a process for determining anchor boxes according to one embodiment. Process 500 may be performed by processing logic which may include software, hardware, or a combination thereof. For example, process 500 may be performed by system 300 of FIG. 3. Referring to FIG. 5A, at block 501, processing logic determines a set of bounding boxes as a set of training bounding box candidates in different dimensions (e.g., sizes and shapes). At block 502, the bounding boxes are plotted onto a 2D space based on their respective dimensions. The x-axis of the 2D space represents the widths of the bounding boxes while the y-axis of the 2D space represents the heights of the bounding boxes. At block 503, the bounding boxes are clustered into one or more bounding box clusters based on the distribution population density of the bounding boxes on the 2D space. For each of the clusters of bounding boxes, at block 504, processing logic determines an anchor box to represent the corresponding cluster. At block 505, the anchor boxes are utilized to train an NN model for object detection, where the NN model is utilized to detect objects during autonomous driving.

Figure 5B:
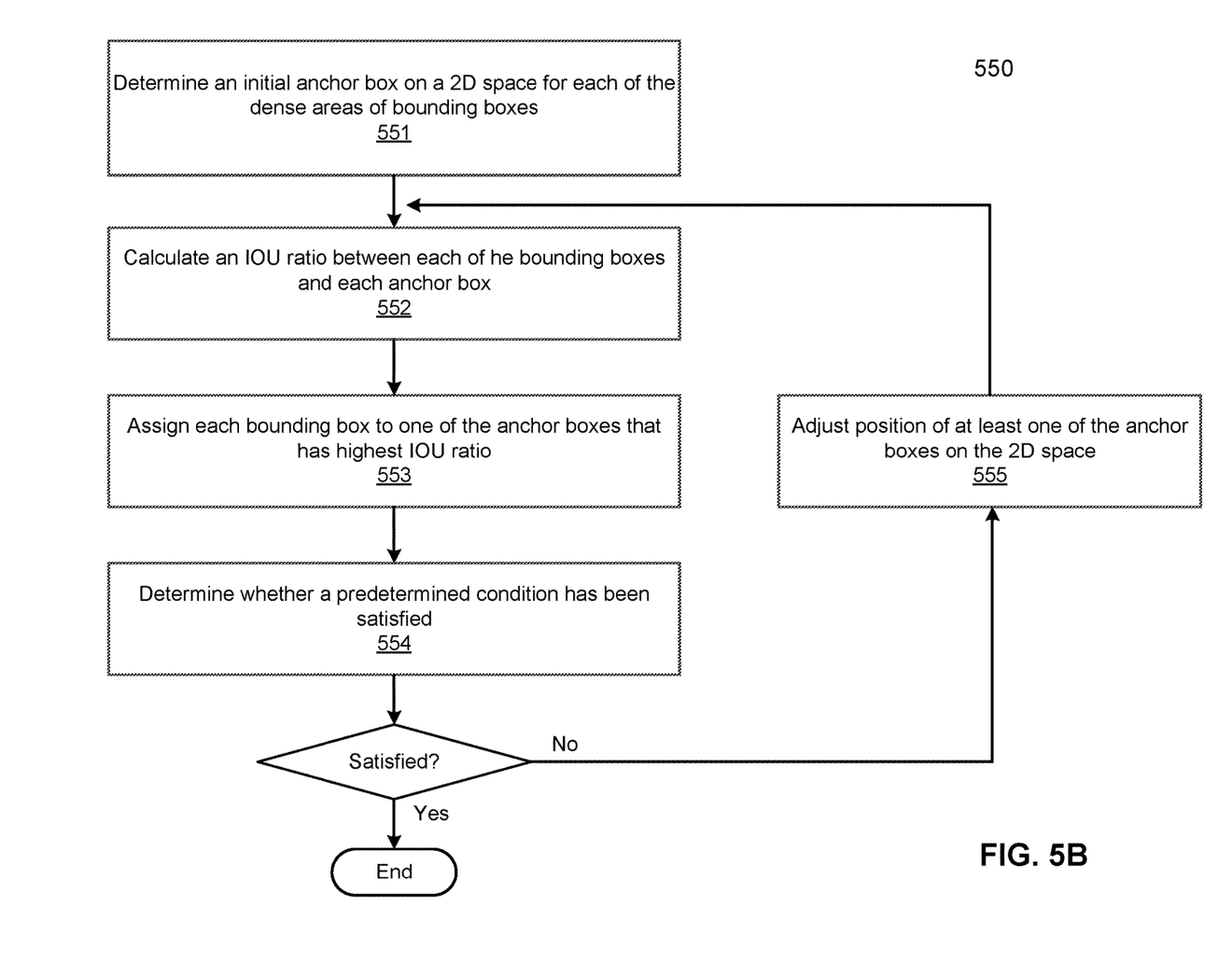

FIG. 5B is a flow diagram illustrating an example of a process for determining anchor boxes according to another embodiment. Process 550 may be performed by processing logic which may include software, hardware, or a combination thereof. Referring to FIG. 5B, at block 551, processing logic determines an initial set of anchor boxes based on the distribution of bounding boxes plotted on a 2D space. At block 552, processing logic calculates an IOU ratio between each of the bounding box candidates and each of the anchor boxes. At block 553, each of the bounding box candidates is assigned to one of the anchor boxes having the highest IOU ratio. At block 554, it is determined whether a predetermined condition has been satisfied by the current set of anchor boxes. If the predetermined condition has not been satisfied, at block 555, the position of at least one of the anchor boxes is adjusted and the above operations of blocks 551-554 are iteratively performed until the predetermined condition has been satisfied.

Figure 6:
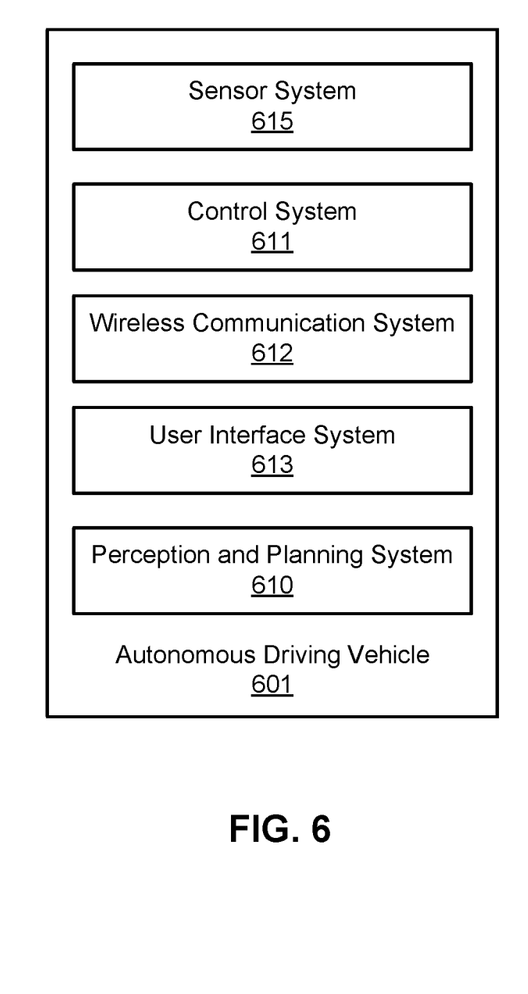
FIG. 6 is a block diagram illustrating an autonomous driving vehicle according to one embodiment.

FIG. 6 is a block diagram illustrating an autonomous driving vehicle according to one embodiment of the disclosure. Referring to FIG. 6, autonomous driving vehicle 601 may be communicatively coupled to one or more servers over a network, which may be any type of networks such as a local area network (LAN), a wide area network (WAN) such as the Internet, a cellular network, a satellite network, or a combination thereof, wired or wireless. The server(s) may be any kind of servers or a cluster of servers, such as Web or cloud servers, application servers, backend servers, or a combination thereof. A server may be a data analytics server, a content server, a traffic information server, a map and point of interest (MPOI) server, or a location server, etc.

An autonomous driving vehicle refers to a vehicle that can be configured to in an autonomous mode in which the vehicle navigates through an environment with little or no input from a driver. Such an autonomous driving vehicle can include a sensor system having one or more sensors that are configured to detect information about the environment in which the vehicle operates. The vehicle and its associated controller(s) use the detected information to navigate through the environment. Autonomous driving vehicle 601 can operate in a manual mode, a full autonomous mode, or a partial autonomous mode.

In one embodiment, autonomous driving vehicle 601 includes, but is not limited to, perception and planning system 610, vehicle control system 611, wireless communication system 612, user interface system 613, infotainment system 114, and sensor system 615. Autonomous driving vehicle 601 may further include certain common components included in ordinary vehicles, such as, an engine, wheels, steering wheel, transmission, etc., which may be controlled by vehicle control system 611 and/or perception and planning system 610 using a variety of communication signals and/or commands, such as, for example, acceleration signals or commands, deceleration signals or commands, steering signals or commands, braking signals or commands, etc.

Components 610-615 may be communicatively coupled to each other via an interconnect, a bus, a network, or a combination thereof. For example, components 610-615 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 7:
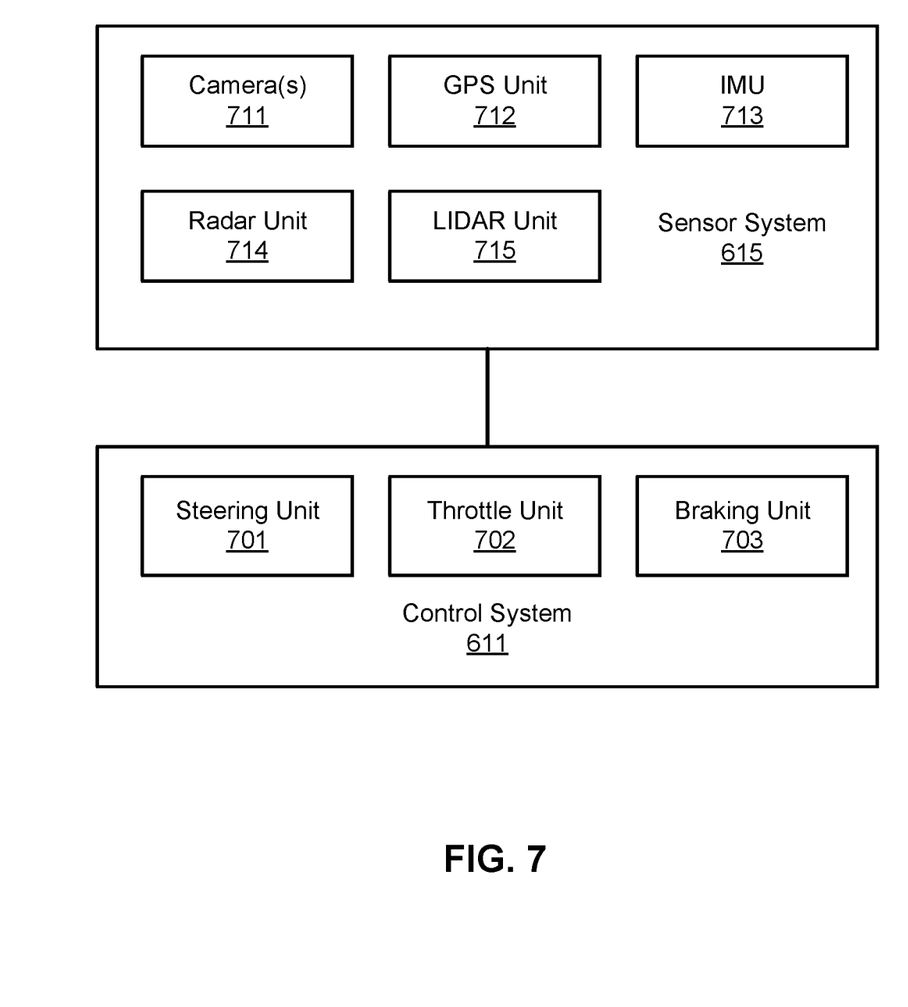
FIG. 7 is a block diagram illustrating an example of an autonomous driving vehicle according to one embodiment.

Referring now to FIG. 7, in one embodiment, sensor system 615 includes, but it is not limited to, one or more cameras 711, global positioning system (GPS) unit 712, inertial measurement unit (IMU) 713, radar unit 714, and a light detection and range (LIDAR) unit 715. GPS system 712 may include a transceiver operable to provide information regarding the position of the autonomous driving vehicle. IMU unit 713 may sense position and orientation changes of the autonomous driving vehicle based on inertial acceleration. Radar unit 714 may represent a system that utilizes radio signals to sense objects within the local environment of the autonomous driving vehicle. In some embodiments, in addition to sensing objects, radar unit 714 may additionally sense the speed and/or heading of the objects. LIDAR unit 715 may sense objects in the environment in which the autonomous driving vehicle is located using lasers. LIDAR unit 715 could include one or more laser sources, a laser scanner, and one or more detectors, among other system components. Cameras 711 may include one or more devices to capture images of the environment surrounding the autonomous driving vehicle. Cameras 711 may be still cameras and/or video cameras. A camera may be mechanically movable, for example, by mounting the camera on a rotating and/or tilting a platform.

Sensor system 615 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous driving vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 611 includes, but is not limited to, steering unit 701, throttle unit 702 (also referred to as an acceleration unit), and braking unit 703. Steering unit 701 is to adjust the direction or heading of the vehicle. Throttle unit 702 is to control the speed of the motor or engine that in turn controls the speed and acceleration of the vehicle. Braking unit 703 is to decelerate the vehicle by providing friction to slow the wheels or tires of the vehicle. Note that the components as shown in FIG. 7 may be implemented in hardware, software, or a combination thereof.

Referring back to FIG. 6, wireless communication system 612 is to allow communication between autonomous driving vehicle 601 and external systems, such as devices, sensors, other vehicles, etc. For example, wireless communication system 612 can wirelessly communicate with one or more devices directly or via a communication network. Wireless communication system 612 can use any cellular communication network or a wireless local area network (WLAN), e.g., using WiFi to communicate with another component or system. Wireless communication system 612 could communicate directly with a device (e.g., a mobile device of a passenger, a display device, a speaker within vehicle 601), for example, using an infrared link, Bluetooth, etc. User interface system 613 may be part of peripheral devices implemented within vehicle 601 including, for example, a keyboard, a touch screen display device, a microphone, and a speaker, etc.

Some or all of the functions of autonomous driving vehicle 601 may be controlled or managed by perception and planning system 610, especially when operating in an autonomous driving mode. Perception and planning system 610 includes the necessary hardware (e.g., processor(s), memory, storage) and software (e.g., operating system, planning and routing programs) to receive information from sensor system 615, control system 611, wireless communication system 612, and/or user interface system 613, process the received information, plan a route or path from a starting point to a destination point, and then drive vehicle 601 based on the planning and control information. Alternatively, perception and planning system 610 may be integrated with vehicle control system 611.

For example, a user as a passenger may specify a starting location and a destination of a trip, for example, via a user interface. Perception and planning system 610 obtains the trip related data. For example, perception and planning system 610 may obtain location and route information from an MPOI server. The location server provides location services and the MPOI server provides map services and the POIs of certain locations. Alternatively, such location and MPOI information may be cached locally in a persistent storage device of perception and planning system 610.

While autonomous driving vehicle 601 is moving along the route, perception and planning system 610 may also obtain real-time traffic information from a traffic information system or server (TIS). Note that the servers may be operated by a third party entity. Alternatively, the functionalities of the servers may be integrated with perception and planning system 610. Based on the real-time traffic information, MPOI information, and location information, as well as real-time local environment data detected or sensed by sensor system 615 (e.g., obstacles, objects, nearby vehicles), perception and planning system 610 can plan an optimal route and drive vehicle 601, for example, via control system 611, according to the planned route to reach the specified destination safely and efficiently.

Figure 8:
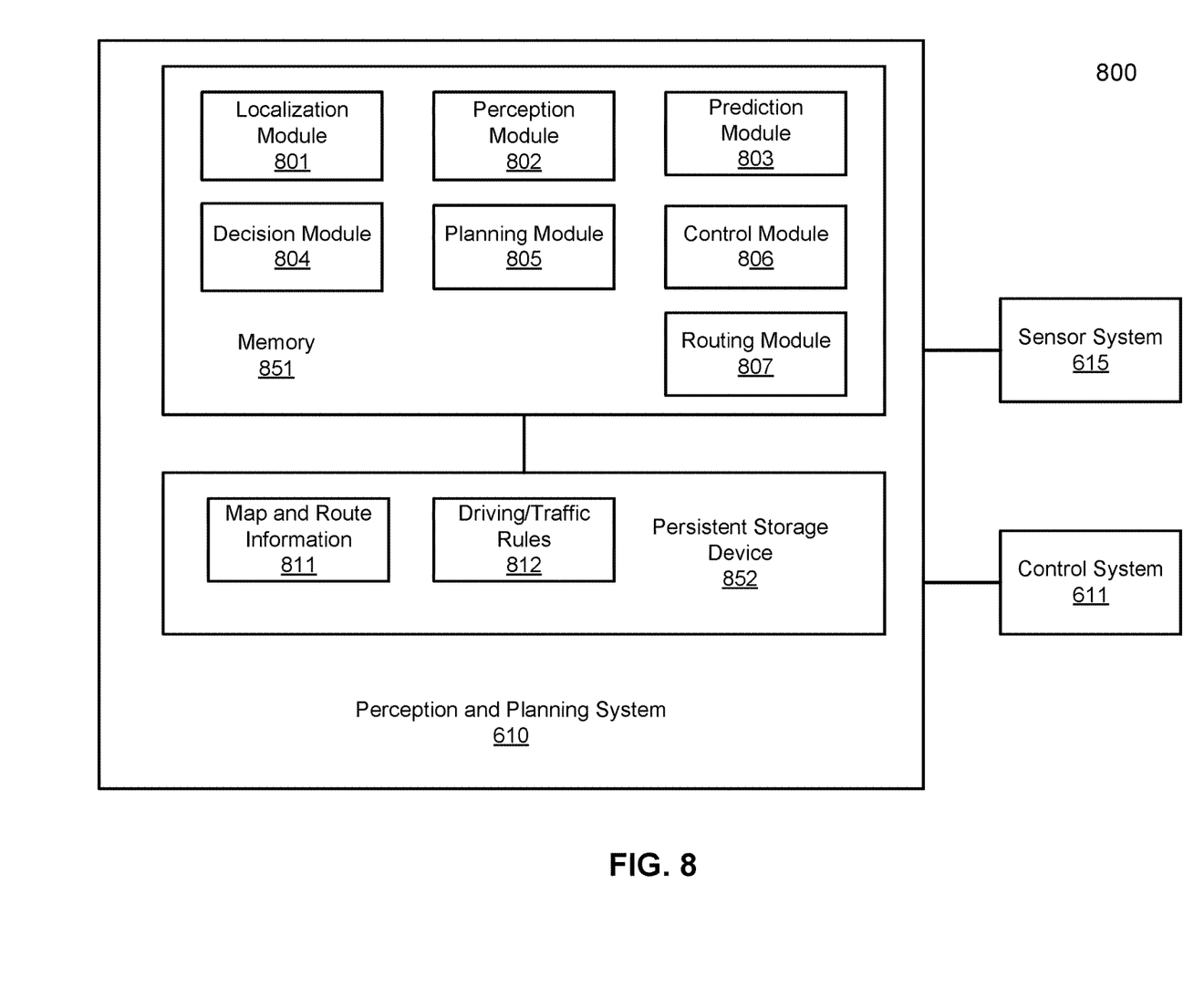
FIG. 8 is a block diagram illustrating an example of a perception and planning system used with an autonomous driving vehicle according to one embodiment.

FIG. 8 is a block diagram illustrating an example of a perception and planning system used with an autonomous driving vehicle according to one embodiment. System 800 may be implemented as a part of autonomous driving vehicle 601 of FIG. 6 including, but is not limited to, perception and planning system 610, control system 611, and sensor system 615. Referring to FIG. 8, perception and planning system 610 includes, but is not limited to, localization module 801, perception module 802, prediction module 803, decision module 804, planning module 805, control module 806, and routing module 807.

Some or all of modules 801-807 may be implemented in software, hardware, or a combination thereof. For example, these modules may be installed in persistent storage device 852, loaded into memory 851, and executed by one or more processors (not shown). Note that some or all of these modules may be communicatively coupled to or integrated with some or all modules of vehicle control system 611 of FIG. 7. Some of modules 801-807 may be integrated together as an integrated module.

Localization module 801 determines a current location of autonomous driving vehicle 300 (e.g., leveraging GPS unit 712) and manages any data related to a trip or route of a user. Localization module 801 (also referred to as a map and route module) manages any data related to a trip or route of a user. A user may log in and specify a starting location and a destination of a trip, for example, via a user interface. Localization module 801 communicates with other components of autonomous driving vehicle 300, such as map and route information 811, to obtain the trip related data. For example, localization module 801 may obtain location and route information from a location server and a map and POI (MPOI) server. A location server provides location services and an MPOI server provides map services and the POIs of certain locations, which may be cached as part of map and route information 811. While autonomous driving vehicle 300 is moving along the route, localization module 801 may also obtain real-time traffic information from a traffic information system or server.

Based on the sensor data provided by sensor system 615 and localization information obtained by localization module 801, a perception of the surrounding environment is determined by perception module 802. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 802 may include a computer vision system or functionalities of a computer vision system to process and analyze images captured by one or more cameras in order to identify objects and/or features in the environment of autonomous driving vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 802 can also detect objects based on other sensors data provided by other sensors such as a radar and/or LIDAR.

For each of the objects, prediction module 803 predicts what the object will behave under the circumstances. The prediction is performed based on the perception data perceiving the driving environment at the point in time in view of a set of map/rout information 811 and traffic rules 812. For example, if the object is a vehicle at an opposing direction and the current driving environment includes an intersection, prediction module 803 will predict whether the vehicle will likely move straight forward or make a turn. If the perception data indicates that the intersection has no traffic light, prediction module 803 may predict that the vehicle may have to fully stop prior to enter the intersection. If the perception data indicates that the vehicle is currently at a left-turn only lane or a right-turn only lane, prediction module 803 may predict that the vehicle will more likely make a left turn or right turn respectively.

For each of the objects, decision module 804 makes a decision regarding how to handle the object. For example, for a particular object (e.g., another vehicle in a crossing route) as well as its metadata describing the object (e.g., a speed, direction, turning angle), decision module 804 decides how to encounter the object (e.g., overtake, yield, stop, pass). Decision module 804 may make such decisions according to a set of rules such as traffic rules or driving rules 812, which may be stored in persistent storage device 852.

Routing module 807 is configured to provide one or more routes or paths from a starting point to a destination point. For a given trip from a start location to a destination location, for example, received from a user, routing module 807 obtains route and map information 811 and determines all possible routes or paths from the starting location to reach the destination location. Routing module 807 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 804 and/or planning module 805. Decision module 804 and/or planning module 805 examine all of the possible routes to select and modify one of the most optimal routes in view of other data provided by other modules such as traffic conditions from localization module 801, driving environment perceived by perception module 802, and traffic condition predicted by prediction module 803. The actual path or route for controlling the ADV may be close to or different from the reference line provided by routing module 807 dependent upon the specific driving environment at the point in time.

Based on a decision for each of the objects perceived, planning module 805 plans a path or route for the autonomous driving vehicle, as well as driving parameters (e.g., distance, speed, and/or turning angle), using a reference line provided by routing module 807 as a basis. That is, for a given object, decision module 804 decides what to do with the object, while planning module 805 determines how to do it. For example, for a given object, decision module 804 may decide to pass the object, while planning module 805 may determine whether to pass on the left side or right side of the object. Planning and control data is generated by planning module 805 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 806 controls and drives the autonomous driving vehicle, by sending proper commands or signals to vehicle control system 611, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 805 plans a next route segment or path segment, for example, including a target position and the time required for the ADV to reach the target position. Alternatively, planning module 805 may further specify the specific speed, direction, and/or steering angle, etc. In one embodiment, planning module 805 plans a route segment or path segment for the next predetermined period of time such as 5 seconds. For each planning cycle, planning module 805 plans a target position for the current cycle (e.g., next 5 seconds) based on a target position planned in a previous cycle. Control module 806 then generates one or more control commands (e.g., throttle, brake, steering control commands) based on the planning and control data of the current cycle.

Note that decision module 804 and planning module 805 may be integrated as an integrated module. Decision module 804/planning module 805 may include a navigation system or functionalities of a navigation system to determine a driving path for the autonomous driving vehicle. For example, the navigation system may determine a series of speeds and directional headings to affect movement of the autonomous driving vehicle along a path that substantially avoids perceived obstacles while generally advancing the autonomous driving vehicle along a roadway-based path leading to an ultimate destination. The destination may be set according to user inputs via user interface system 613. The navigation system may update the driving path dynamically while the autonomous driving vehicle is in operation. The navigation system can incorporate data from a GPS system and one or more maps so as to determine the driving path for the autonomous driving vehicle.

According to one embodiment, perception module 302 may include an NN model to detect objects based on sensor data (e.g., images and/or point clouds) obtained from variety of sensors such as cameras, LIDAR, and/or RADAR devices. The NN model may be trained using a set of anchor boxes selected using at least some of the techniques described above.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for determining anchor boxes for training a neural network object detection model for autonomous driving, the method comprising:
   plotting a plurality of bounding boxes in a two-dimensional (2D) space based on their respective dimensions;
   clustering the plurality of bounding boxes into one or more clusters of the bounding boxes based on a distribution density of the bounding boxes on the 2D space;
   for each of the clusters of bounding boxes, determining an anchor box to represent the corresponding cluster;
   determining whether a distribution of the bounding boxes assigned to the anchor boxes satisfies a predetermined condition;
   in response to determining that the predetermined condition has not been satisfied, adjusting a dimension of at least one of the anchor boxes on the 2D space; and
   training a neural network model for detecting objects using the anchor boxes, wherein the neural network model is utilized to detect objects based on at least one of an image or a point cloud captured by a sensor of an autonomous driving vehicle.

2. The method of claim 1, wherein an X axis of the 2D space represents width of bounding boxes and a Y axis of the 2D space represents heights of the bounding boxes.

3. The method of claim 1, wherein clustering the bounding boxes and determining the anchor box to represent each of the clusters comprise:
for each of the bounding boxes, calculating a matching degree between the bounding box and each of the anchor boxes; and
assigning the bounding box to one of the anchor boxes that has a largest overlapped area.

4. The method of claim 3, further comprising:
iteratively performing calculating a matching degree between each bounding box and each anchor box and assigning each bounding box to one of the anchor boxes, until the predetermined condition is satisfied.

5. The method of claim 4, wherein the predetermined condition requires a number of bounding boxes assigned to each of the anchor boxes is greater than a predetermined threshold.

6. The method of claim 4, wherein the predetermined condition requires that each of the anchor boxes falls within a dense area of the bounding boxes on the 2D space.

7. The method of claim 4, wherein the predetermined condition requires that an aspect ratio of each of the bounding boxes assigned to a particular anchor box is within a predetermined range.

8. The method of claim 3, wherein the matching degree between the bounding box and each anchor box is determined based on an overlapped area between the bounding box and each anchor box.

9. The method of claim 8, wherein calculating matching degree between the bounding box and each anchor box comprises calculating an intersection-to-union (IOU) ratio between the bounding box and each anchor box to represent the matching degree.

10. A non-transitory machine-readable medium having instructions stored therein, which when executed by a processor, cause the processor to perform operations, the operations comprising:
plotting a plurality of bounding boxes in a two-dimensional (2D) space based on their respective dimensions;
clustering the plurality of bounding boxes into one or more clusters of the bounding boxes based on a distribution density of the bounding boxes on the 2D space;
for each of the clusters of bounding boxes, determining an anchor box to represent the corresponding cluster;
determining whether a distribution of the bounding boxes assigned to the anchor boxes satisfies a predetermined condition;
in response to determining that the predetermined condition has not been satisfied, adjusting a dimension of at least one of the anchor boxes on the 2D space; and
training a neural network model for detecting objects using the anchor boxes, wherein the neural network model is utilized to detect objects based on at least one of an image or a point cloud captured by a sensor of an autonomous driving vehicle.

11. The machine-readable medium of claim 10, wherein an X axis of the 2D space represents width of bounding boxes and a Y axis of the 2D space represents heights of the bounding boxes.

12. The machine-readable medium of claim 10, wherein clustering the bounding boxes and determining the anchor box to represent each of the clusters comprise:
for each of the bounding boxes, calculating a matching degree between the bounding box and each of the anchor boxes; and
assigning the bounding box to one of the anchor boxes that has a largest overlapped area.

13. The machine-readable medium of claim 12, wherein the operations further comprise:
iteratively performing calculating a matching degree between each bounding box and each anchor box and assigning each bounding box to one of the anchor boxes, until the predetermined condition is satisfied.

14. The machine-readable medium of claim 13, wherein the predetermined condition requires a number of bounding boxes assigned to each of the anchor boxes is greater than a predetermined threshold.

15. The machine-readable medium of claim 13, wherein the predetermined condition requires that each of the anchor boxes falls within a dense area of the bounding boxes on the 2D space.

16. The machine-readable medium of claim 13, wherein the predetermined condition requires that an aspect ratio of each of the bounding boxes assigned to a particular anchor box is within a predetermined range.

17. The machine-readable medium of claim 12, wherein the matching degree between the bounding box and each anchor box is determined based on an overlapped area between the bounding box and each anchor box.

18. The machine-readable medium of claim 17, wherein calculating the matching degree between the bounding box and each anchor box comprises calculating an intersection-to-union (IOU) ratio between the bounding box and each anchor box to represent the matching degree.

19. A data processing system, comprising:
a processor; and
a memory coupled to the processor to store instructions, which when executed by the processor, cause the processor to perform operations, the operations including
plotting a plurality of bounding boxes in a two-dimensional (2D) space based on their respective dimensions,
clustering the plurality of bounding boxes into one or more clusters of the bounding boxes based on a distribution density of the bounding boxes on the 2D space,
for each of the clusters of bounding boxes, determining an anchor box to represent the corresponding cluster,
determining whether a distribution of the bounding boxes assigned to the anchor boxes satisfies a predetermined condition,
in response to determining that the predetermined condition has not been satisfied, adjusting a dimension of at least one of the anchor boxes on the 2D space; and
training a neural network model for detecting objects using the anchor boxes, wherein the neural network model is utilized to detect objects based on at least one of an image or a point cloud captured by a sensor of an autonomous driving vehicle.

20. The system of claim 19, wherein an X axis of the 2D space represents width of bounding boxes and a Y axis of the 2D space represents heights of the bounding boxes.

\* \* \* \* \*